Figure 1:
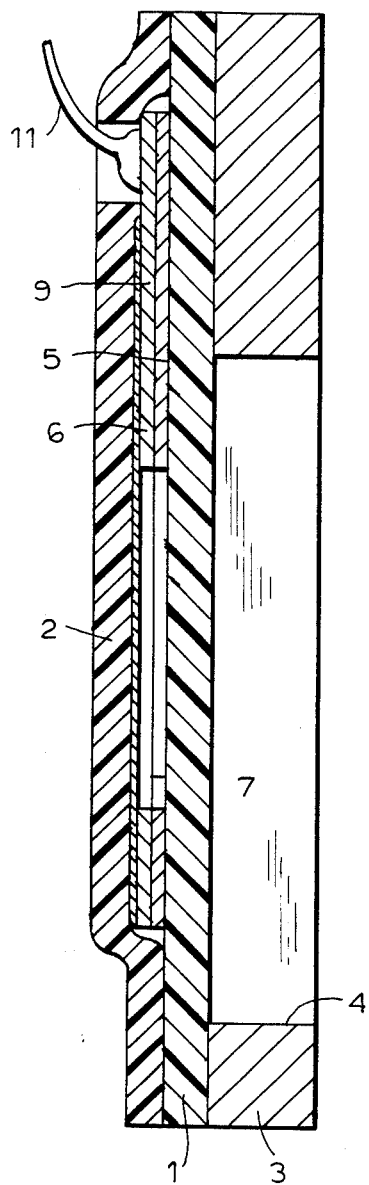

United States Patent [19]

Burger et al.

[11] Patent Number: 4,708,769
[45] Date of Patent: Nov. 24, 1987

[54] TEMPERATURE DEPENDENT ELECTRIC RESISTOR PROBE AND A METHOD OF MAKING THE SAME

[75] Inventors: Kurt Burger, Friolzheim; Heinz Friedrich, Gerlingen; Thomas Mölkner; Peter Schöttle, both of Stuttgart, all of Fed. Rep. of Germany

[73] Assignee: Robert Bosch GmbH, Stuttgart, Fed. Rep. of Germany

[21] Appl. No.: 852,808

[22] PCT Filed: Jul. 19, 1985

[86] PCT No.: PCT/DE85/00247
§ 371 Date: Feb. 21, 1986
§ 102(e) Date: Feb. 21, 1986

[87] PCT Pub. No.: WO86/01290
PCT Pub. Date: Feb. 27, 1986

[30] Foreign Application Priority Data

Aug. 16, 1984 [DE] Fed. Rep. of Germany ....... 3430075

[51] Int. Cl.$^4$ ..................... H01L 21/312; C03C 15/00
[52] U.S. Cl. .................................. 156/659.1; 29/612; 427/10
[58] Field of Search ............ 374/144; 338/28; 361/386; 156/659.1; 29/612; 427/102, 103; 428/207

[56] References Cited

U.S. PATENT DOCUMENTS

| | | | |
|---|---|---|---|
| 3,115,423 | 12/1963 | Ashworth | 427/102 |
| 4,002,924 | 1/1977 | Busch | 374/144 X |
| 4,103,275 | 7/1978 | Diehl et al. | 338/28 X |
| 4,129,848 | 12/1978 | Frank et al. | 204/192 F X |
| 4,134,095 | 1/1979 | Reddy | 338/28 X |
| 4,470,872 | 9/1984 | Sudo et al. | 156/901 X |
| 4,481,049 | 11/1984 | Reichmanis et al. | 156/659.1 X |
| 4,543,153 | 9/1985 | Nelson | 156/666 X |
| 4,581,099 | 4/1986 | Fukaya et al. | 156/659.1 X |
| 4,586,829 | 5/1986 | Hubner et al. | 374/183 X |
| 4,595,298 | 6/1986 | Frederick | 374/144 |
| 4,599,136 | 7/1986 | Araps et al. | 156/659.1 X |

FOREIGN PATENT DOCUMENTS 2302615 10/1976 Fed. Rep. of Germany .

*Primary Examiner*—Daniel M. Yasich
*Attorney, Agent, or Firm*—Michael J. Striker

[57] ABSTRACT

A method of making a temperature dependent resistor probe for measuring temperature or mass of a flowing medium includes (a) preparation of a support plate of a metallic material; (b) applying a support foil of a temperature resistant plastic material on one side of the support plate; (c) applying a layer of temperature dependent resistive material on the support foil and finishing the resistive layer into a measuring resistor layer; and thereafter, an opening is formed in the support plate in the area below the measuring resistor layer.

6 Claims, 3 Drawing Figures

F I G. 3
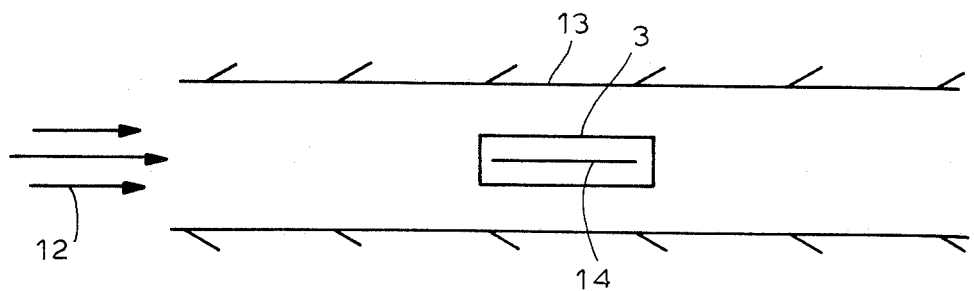

TEMPERATURE DEPENDENT ELECTRIC RESISTOR PROBE AND A METHOD OF MAKING THE SAME

STATE OF THE ART

The invention is based on a method for making a measuring probe of the type which includes a measuring resistor layer of a temperature dependent electrically resistive material applied on a support foil which is mounted on the side of a planar support body. The probe of this invention is used for measuring temperature of intake air mass or fuel in internal combustion engines. Such a measuring probe is known from DE-OS No. 23 02 615. In this patent a temperature dependent electric resistor for a measuring probe is described which consists of a metal layer or coating preferably of gold. The shape of the resistor is made by means of metalizing with masks on a thin plastic foil. The foil is mounted on a support element which is provided with a recess in the area opposite of the resistor layer and the recess is covered by the foil. Thereby, it is obtained that the resistor is mechanically robust, has a small heat capacity and thereby a short thermal time constant, i.e., a high reaction speed with respect to the change of mass and/or temperature of the medium flow. When making this known measuring probe, at first the recess is shaped in the support element, then the foil is mounted on the support element, and subsequently the resistor layer is evaporated on the foil mounted on the support element. In this known method the danger exists that the thin foil may become damaged by pressures exerted, for example, during the mounting on the support element, during the evaporation process of the resistor layer or during the transport of the support element with the mounted foil to the evaporation station, since in the area of the recess the support is missing.

ADVANTAGES OF THE INVENTION

The method in accordance with the invention provides that the entire surface of the pressure sensitive foil is in contact with the support element during the mounting of the metal layer and, if desired, during the mounting of a cover foil, so that the foil carrying the resistor layer is better protected against damages caused by pressure effects and the like, than in the known device in which the recess in the support element is present before mounting of the foil. Moreover, a measuring probe made in accordance with the suggested method is mechanically very stable, so that even when using rapid flowing medium no deformations of the resistor layer occur, which would cause undesirable resistor changes. It is of importance that the original stability of the support element remains preserved until the mounting of the resistor layer and, if need be, the cover foil, because the support element is able to provide a larger resistance to deformation forces than an element which already had been weakened by a recess before the actual manufacturing operation.

DRAWING

Figure 2:
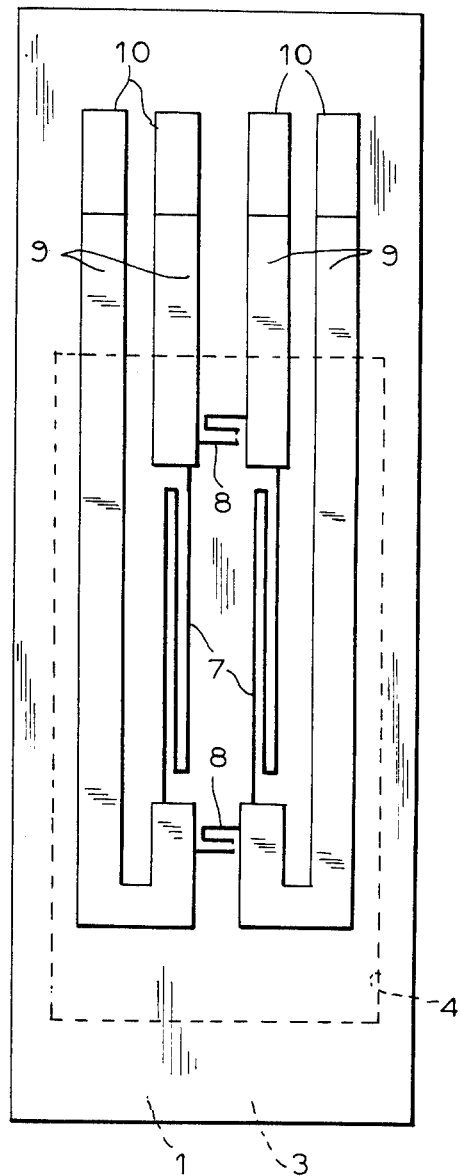

Details and features of the invention are provided in the drawing and the subsequent description, whereby one exemplified embodiment is illustrated in a simplified manner in the drawing, wherein:

FIG. 1 illustrates a section through a probe for measuring the temperature or mass of a flowing medium, FIG. 2 illustrates a plan view of the measuring probe in accordance with FIG. 1 without cover foil, and FIG. 3 shows schematically the measuring probe arranged in a flow of a medium to be measured.

DESCRIPTION OF THE EXEMPLIFIED EMBODIMENT

The measuring probe illustrated in the figures has a support foil 1 made of temperature resistant plastic, for example, made of polyimide with a one or both sided cover layer made of fluorcarbon. A cover foil 2 which will be described below is made of the same material. Moreover, the measuring probe has a planar support element 3 having two opposite major sides on one of which the foil 1 is mounted by means of welding or adhering. In the exemplified embodiment the support element consists of a plate of metallic material, preferably a CuBe-alloy. The thickness of the plate has a dimension of about 0.3 mm. The plate has a recess 4 in form of a window like, rectangular opening, which will be subsequently discussed in more detail.

After being mounted on the support element 3, the foil 1 is metallized over its total face with a layer system 5,6 of resistor material applied by means of vacuum coating. From this total face coating temperature dependent resistors 7, temperature independent resistors 8 and conductors 9 are formed by means of a mask etching process, as can be seen in FIG. 2, whereby the temperature independent resistors 8 may include tantal and the temperature dependent resistors 7 may include nickel.

When the resistors and conductors are formed by the mask etching process with a view to the given type of application, a resistance adjustment can be performed by cutting off material from resistors 7 and, in the temperature independent layer removing parts by anodic oxidation, or the like.

Thereafter the cover foil 2 is mounted and is sealingly and firmly connected with the support foil 1 by welding and/or by a chemical reaction, whereby the locations 10 for connecting electrical contacts and also the connections 11 on the conductors 9 remain free. Subsequently, the recess 4 is made in the support element 3 by means of a mask etching process. Thus, a framelike structure is generated which supports the completed measuring probe and provides a mechanical stability for the same. The recess 4 extends below an area of the foil 1 which supports the measuring resistors 7,8 this arrangement has the advantage that practically no heat flow occurs between the resistors and the support element during changing flow of a medium under measurement, so that the probe has a high reaction speed during change of the mass and/or the temperature of the medium flow. Accordingly, by virtue of the recess 4 a satisfactory thermal separation among respective measuring resistors 7, 8 and their mechanical support is obtained.

It is essential that the recess 4 in support element 3 be created only after the measuring part of the probe has been finished. This means that during the manufacture of the probe the entire noninterrupted surface of the support element 3 is available as a reinforcement for support foil 1 until cover foil 2 has been applied on the foil and the probe has been finished. Thus, damages of the resistors and the foils due to mechanical effects during the manufacturing process can be effectively prevented and, moreover, the manufacturing process is simplified.

Since the thermal expansion of a support element 3 made of alloy CuBe is larger than that of a plastic foil made from polyimide, the foil 1 remains always tightly mounted even under changing temperature conditions, thus a further prerequisite for a long term constancy of the resistor value is met.

FIG. 3 shows an application of a measuring probe 14 of this invention for measuring temperature of as air mass 12 flowing through an air intake channel 13 of an internal combustion engine.

We claim:

1. A method of making a temperature dependent electric resistor probe, particularly for measuring temperature of intake air mass and/or fuel mass in internal combustion engines, comprising the steps of
   (a) preparing a planar support element defining two opposite major sides; then
   (b) securing a support foil of a temperature resistant plastic material on one of said major sides; then
   (c) applying a layer of temperature dependent electrically resistive material on the support foil and finishing the resistive layer into a measuring resistor layer on the other side; and then
   (d) forming a recess through the planar support element from the other major side of the planar support element in a region opposite the finished measuring resistor layer.

2. Method in accordance with claim 1, wherein the support element consists of a metallic material and the recess is formed by means of a mask etching process.

3. Method in accordance with claim 1, wherein the support foil is welded to or chemically connected with the support element.

4. A method of making a temperature dependent electric resistor probe, particularly for measuring temperature of intake air mass and/or fuel mass in internal combustion engines, comprising the steps of
   (a) preparing a planar support defining two opposite major sides; then
   (b) securing a support foil of a temperature resistant plastic material on one of said major sides; then
   (c) applying a layer of temperature dependent electrically resistive material on the support foil and finishing the resistive layer into a measuring resistor layer on the other side; then
   (d) applying a protective cover foil on the measuring resistor layer and securing marginal portions of the cover foil to the support foil; and then
   (e) forming a recess in the other major side of the planar support element through the planar support element from the region opposite the finished measuring resistor layer.

5. Method in accordance with claim 4 wherein the support element consists of a metallic material and the recess is formed by means of a mask etching process.

6. Method in accordance with claim 4 wherein the support foil is welded to or chemically connected with the support element.

* * * * *